(12) United States Patent
Mattina

(10) Patent No.: US 7,395,381 B2
(45) Date of Patent: Jul. 1, 2008

(54) METHOD AND AN APPARATUS TO REDUCE NETWORK UTILIZATION IN A MULTIPROCESSOR SYSTEM

(75) Inventor: Matthew C. Mattina, Worcester, MA (US)

(73) Assignee: Intel Corporation, Santa Clara, CA (US)

( * ) Notice: Subject to any disclaimer, the term of this patent is extended or adjusted under 35 U.S.C. 154(b) by 332 days.

(21) Appl. No.: 11/084,423

(22) Filed: Mar. 18, 2005

(65) Prior Publication Data

US 2006/0212660 A1 Sep. 21, 2006

(51) Int. Cl.
G06F 12/00 (2006.01)

(52) U.S. Cl. .................. 711/146; 711/147; 711/148; 711/141; 711/135; 711/138

(58) Field of Classification Search .............. 711/146, 711/147, 148, 141, 135, 138
See application file for complete search history.

(56) References Cited

U.S. PATENT DOCUMENTS

| | | | |
|---|---|---|---|
| 5,297,269 A | 3/1994 | Donaldson et al. | |
| 5,557,767 A | 9/1996 | Sukegawa | |
| 5,819,296 A | 10/1998 | Anderson et al. | |
| 6,067,611 A | 5/2000 | Carpenter et al. | |
| 6,092,155 A | 7/2000 | Olnowich | |
| 6,189,043 B1 | 2/2001 | Buyukkoc et al. | |
| 6,263,409 B1 | 7/2001 | Haupt et al. | |
| 6,275,905 B1 | 8/2001 | Keller et al. | |
| 6,275,907 B1 | 8/2001 | Baumgartner et al. | |
| 6,338,122 B1 | 1/2002 | Baumgartner et al. | |
| 6,442,597 B1 | 8/2002 | Deshpande et al. | |
| 6,477,535 B1 | 11/2002 | Mirzadeh | |
| 6,478,498 B1 | 11/2002 | Miyasaka et al. | |
| 6,484,220 B1 | 11/2002 | Alvarez, II et al. | |
| 6,493,809 B1 | 12/2002 | Safranek et al. | |
| 6,567,900 B1 | 5/2003 | Kessler | |
| 6,578,116 B2 | 6/2003 | Bachand et al. | |
| 6,594,733 B1 | 7/2003 | Cardente | |
| 6,631,447 B1 | 10/2003 | Morioka et al. | |
| 6,631,449 B1 | 10/2003 | Borrill | |
| 6,636,944 B1 | 10/2003 | Gilbert et al. | |
| 6,640,287 B2 | 10/2003 | Gharachorloo et al. | |
| 6,647,466 B2 * | 11/2003 | Steely, Jr. ................. | 711/138 |
| 6,728,841 B2 | 4/2004 | Keller | |
| 6,769,017 B1 | 7/2004 | Bhat et al. | |

(Continued)

OTHER PUBLICATIONS

PCT Written Opinion for PCT Appln No. US2006/009660, mailed Jan. 9, 2006 (4 pages).

(Continued)

Primary Examiner—Kimberly McLean-Mayo
(74) Attorney, Agent, or Firm—Blakely, Sokoloff, Taylor & Zafman LLP

(57) ABSTRACT

A method and an apparatus to reduce network utilization for source-based snoopy cache coherent protocols have been disclosed. In one embodiment, the method includes receiving at a first processor an invalidating snoop with respect to a physical address of a portion of a memory in a multiprocessor system from a second processor, checking whether a cache of the first processor stores a copy of data associated with the physical address, and recording an identification (ID) of the second processor if the cache of the first processor stores the copy of data associated with the physical address. Other embodiments have been claimed and described.

18 Claims, 5 Drawing Sheets

U.S. PATENT DOCUMENTS

| | | |
|---|---|---|
| 6,795,900 B1 | 9/2004 | Miller et al. |
| 6,874,053 B2 | 3/2005 | Yasuda et al. |
| 6,877,030 B2 | 4/2005 | Deneroff |
| 6,901,485 B2 | 5/2005 | Arimilli et al. |
| 6,922,755 B1 | 7/2005 | Safranek et al. |
| 6,934,814 B2 | 8/2005 | Glasco et al. |
| 6,941,440 B2 | 9/2005 | Moll et al. |
| 2002/0087809 A1 | 7/2002 | Arimilli et al. |
| 2002/0129211 A1 | 9/2002 | Armilli et al. |
| 2002/0178210 A1 | 11/2002 | Khare et al. |
| 2003/0005236 A1 | 1/2003 | Arimilli et al. |
| 2003/0097529 A1 | 5/2003 | Arimilli et al. |
| 2004/0068620 A1 | 4/2004 | Van Doren et al. |
| 2004/0123045 A1 | 6/2004 | Hum et al. |
| 2005/0160231 A1 | 7/2005 | Van Doren et al. |
| 2005/0198440 A1 | 9/2005 | Van Doren et al. |
| 2005/0262250 A1 | 11/2005 | Batson et al. |

OTHER PUBLICATIONS

PCT International Search Report for PCT Appln. No. US2006/009660, mailed Jan. 9, 2006 (3 pages).

Cen, Ling, PCT/US2005/012087 International Preliminary Report, Nov. 9, 2006. 12 pgs.

Cen, Ling, PCT/US2005/012087 Search Report, Oct. 28, 2006. 18 pgs.

P13923PCT, Search Report for PCT/US/03/37782, Jan. 9, 2006.

Gabriele Satori, "HyperTransport Technology", Platform Conference, Jul. 24-25, 2001.

Gabriele Satori, "HyperTransport Technology Overview & Consortium Announcement", Platform Conference, Jul. 24-25, 2001.

"IEEE Standard for Scalable Coherent Interface (SCI)," IEEE Std 1596-1992, pp. i-243, Institute of Electrical and Electronics Engineers, Inc., USA.

"UltraSPARC User's Manual, Ultra SPARC-I, Ultra SPARC-II," Jul. 1997, iii-394, Sun Microsystems, USA.

Rajawar, R., et al. "Improving the throughput of synchronization by insertion delays." High-performance Computer Architecture, IEEE Computer SOC, pp. 168-179, Jan. 8, 2000.

Azimi, M., et al. "Scalability port: a coherent interface for shared memory mulitprocessors," High-performance Interconnects, IEEE, pp. 65-70. Aug. 21, 2002.

Lilja, DJ. "Cache Coherence in Large-scale Shared-memory Multi-processors: Issues and Comparisons," ACM Computing Surveys, pp. 303-338. Sep. 2003.

Ender, Bilir E. et al, "Multicast Snooping: A New Coherence Method Using a Multicast Address Network," Computer Architecture News, pp. 294-304, May 1999.

The Authoritative Dicitionary of IEEE Standar Terms 7th Edition, The Institute of Electrical and Electronics Engineers, Inc., pp. 217, 574, and 882, 2000.

*Wkipedia*. "Dynamic Random Acess Memory," Revision as of Mar. 31, 2003, http://en.wikipedia.org/wiki/Dynamic_access_memory.

Tender, et al., "POWER4 System Microarchitecture Technical White Paper," IBM Server Group, Oct. 2001, pp. 1-6.

Jim Handy, "The Cache Memory Book," Second Edition, 1998, pp. vii-229, Academic Press Limited, London, United Kingdom.

\* cited by examiner

METHOD AND AN APPARATUS TO REDUCE NETWORK UTILIZATION IN A MULTIPROCESSOR SYSTEM

TECHNICAL FIELD

Embodiments of the invention relate generally to improving efficiency in a multiprocessor system, and more particularly, to reducing network utilization in a multiprocessor system.

BACKGROUND

Source-based snooping protocols have recently emerged as a useful technique for latency reduction in a small-scale link-based multiprocessor system. These protocols are effective because on a miss to a block of data in a memory within the system, such as block B, in the last level cache, the missing processor, processor S, typically sends a snoop (also known as a probe) to each of the remaining processors in the system. A snoop is a query sent from a first processor to a second processor to check if the cache of the second processor has a particular piece of data.

In response to the snoop, the processors check their caches to determine if the cache of any one of the processors has the requested data, block B. If the cache of a processor N has block B, processor N may send a copy of block B to processor S, where processor N and processor S are distinct processors. This is a relatively fast cache-to-cache transfer, and the latency experienced by processor S is generally less than would otherwise occur if processor S were to retrieve block B from the memory. Typically, there are various policies to ensure that if more than one processor has copies of block B, only one processor may deliver a copy of block B to processor S.

These source-based snooping protocols use a large amount of network bandwidth within the multiprocessor system. One reason is that each miss typically generates a separate snoop for each processor in the system (except the missing processor). This increase in network traffic causes increased link utilization, which in turn causes increased latencies. Moreover, the amount of network bandwidth used increases even more as the number of processors in the system increases.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A method and an apparatus to reduce network utilization in a multiprocessor system are disclosed. In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1A:
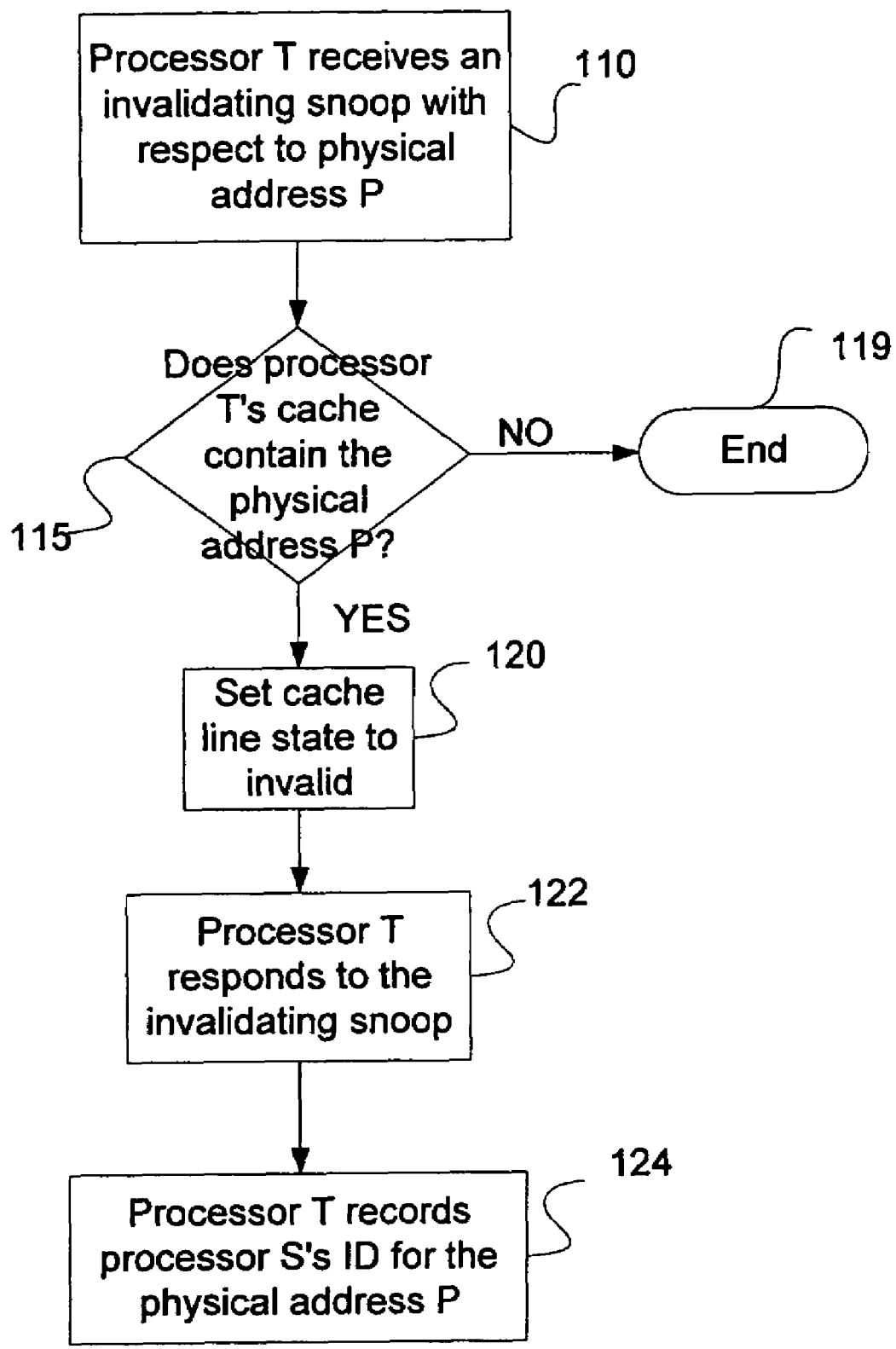
FIG. 1A shows one embodiment of a process to keep track of which processor in a multiprocessor system sends an invalidating snoop to another processor within the multiprocessor system.

FIG. 1A shows one embodiment of a process to keep track of which processor in a multiprocessor system sends an invalidating snoop to another processor in the multiprocessor system. The process is performed by processing logic that may comprise hardware (e.g., circuitry, dedicated logic, etc.), software (such as a program operable to run on a general-purpose computer system or a dedicated machine), or a combination of both. The processing logic may also comprise firmware (i.e., microcode). In one embodiment, the processing logic is integrated into each of the processors tracking the sending of invalidating snoops.

In one embodiment, one of the processors in the multiprocessor system, processor T, receives an invalidating snoop with respect to physical address P (processing block 110). An invalidating snoop with respect to physical address P is a snoop sent to invalidate a copy of the data associated with physical address P in the recipient processor. Physical address P may correspond to a predetermined portion of a memory in the multiprocessor system, such as a block, a byte, etc. For instance, in the following example, physical address P may correspond to block B in the memory. The invalidating snoop is sent from another processor, processor S, in the multiprocessor system. Processor S may have sent the invalidating snoop to indicate that processor S has changed, modified, or updated the data associated with physical address P, and hence, the copies of the data associated with physical address P in the caches of other processors in the multiprocessor system, if any, is no longer valid. In some embodiments, processor S sends the invalidating snoop to all processors (except processor S) in the system. This is also referred to as broadcasting the invalidating snoop.

After receiving the invalidating snoop at processor T, processing logic determines whether a cache of processor T contains physical address P (processing block 115). In some embodiments, the cache of processor T has one or more cache tag address fields to store the physical address(es) of the data in the cache of processor T. Hence, processing logic may check the content of the cache tag address fields of the cache of processor T to determine whether any one of the addresses in the cache tag address fields matches physical address P. If the cache does not contain physical address P, the process ends (processing block 119). Otherwise, processing logic transitions to processing block 120.

Note that if the cache of processor T contains physical address P, the cache has a copy of the data associated with physical address P. After determining that the cache contains physical address P, processing logic may set a cache line state corresponding to the cache tag address field that contains physical address P to be Invalid (processing block 120). The cache line state may be stored in the cache of processor T. Note that various cache line states may be defined in the multiprocessor system, such as Modified, Shared, Exclusive, Invalid, Forward, etc. Processor T may respond to the invalidating snoop from processor S (processing block 122). For example, processor T may send the copy of the data associated with physical address P in the cache of processor T to processor S in response to the invalidating snoop.

In some embodiments, processing logic records the identification (ID) of processor S for physical address P (processing block 124). Processing logic may record the ID of processor S in a variety of ways. In one embodiment, the ID of processor S is encoded in the cache line state corresponding to the cache tag address field containing physical address P in the cache of processor T. For example, in a two-processor system having processor 0 and processor 1, one bit may be appended to the field containing the cache line state such that the one bit is set to "0" to record the ID of processor 0 if processor 0 has sent an invalidating snoop. Likewise, the one bit may be set to "1" to record the ID of processor 1 if processor 1 has sent the invalidating snoop. In another example involving a four-processor system, two bits may be appended to the field containing the cache line state to record the identification of one of the four processors.

Although the above example merely discusses the process with reference to processor T, substantially similar process may be performed for other processors in the multiprocessor system when the other processors receive invalidating snoops from processor S. In some embodiments, the invalidating snoops may be sent in parallel to processor T and the other processors. Processing logic may perform the process described above for each processor within the multiprocessor system (except processor S) substantially in parallel.

Figure 1B:
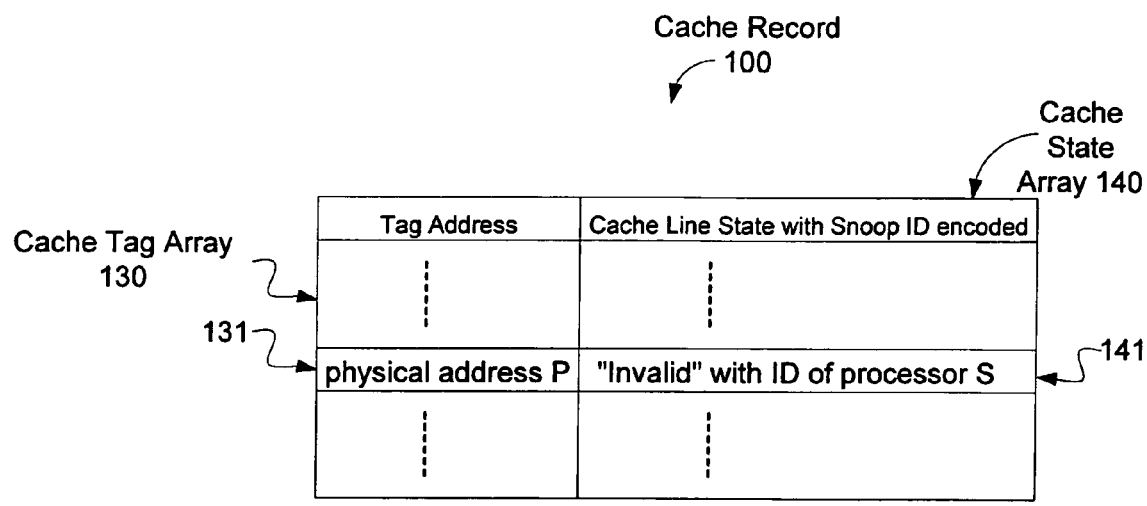
FIG. 1B shows an example of an embodiment of a cache record.

FIG. 1B shows an example of an embodiment of a cache record. The cache record 100 may be stored in a cache of a processor within a multiprocessor system, such as processor T in the above example. The cache record 100 includes two arrays, namely, a cache tag array 130 and a cache state array 140. In some embodiments, the cache tag array 130 stores a number of cache tag addresses associated with some predetermined portions (e.g., blocks, bytes, etc.) of a memory in the multiprocessor system if the cache contains a copy of the data associated with the cache tag addresses. For example, if the cache has a copy of data associated with physical address P of the memory, one of the cache tag addresses in the cache tag array 130 is physical address P.

As mentioned above, the cache record 100 further includes a cache state array 140. In some embodiments, the cache state array 140 stores a number of cache line states, each corresponding to a distinct cache tag address in the cache tag array 130. Various states may be defined for the cache tag state, such as Modified, Exclusive, Shared, Invalid, Forward, etc. Referring to the example discussed above with reference to FIG. 1A, one of the cache tag addresses in the cache tag array 130 is physical address P 131 and a corresponding cache line state in the cache state array 140 is set to Invalid 141 in response to receiving the invalidating snoop.

In some embodiments, the cache line states stored in the cache state array 140 are encoded with the ID of the corresponding processors that have sent invalidating snoops (also referred to as the invalidating processors). The ID of the invalidating processor may be encoded in a variety of ways. For instance, one or more bits may be appended to a cache line state to encode the ID of the invalidating processor. In one example involving a four-processor system, the cache line state, Invalid, is defined to be "00". Then two bits may be appended to "00" to encode the ID of the invalidating processor such that "0000" indicates that processor 0 is the invalidating processor, "0001" indicates that processor 1 is the invalidating processor, "0010" indicates that processor 2 is the invalidating processor, and "0011" indicates that processor 3 is the invalidating processor.

Alternatively, one or more bits may be put in front of the cache line state to encode the ID of the invalidating processor. With the ID of the invalidating processor encoded in the cache line state, the processor (such as processor T) may use this information to predict which processor within the multiprocessor system is most likely to have a current valid copy of the data associated with the physical address P later when the processor requests the data associated with the physical address P. Details of some embodiments of this process are described below with reference to FIG. 2.

Figure 2:
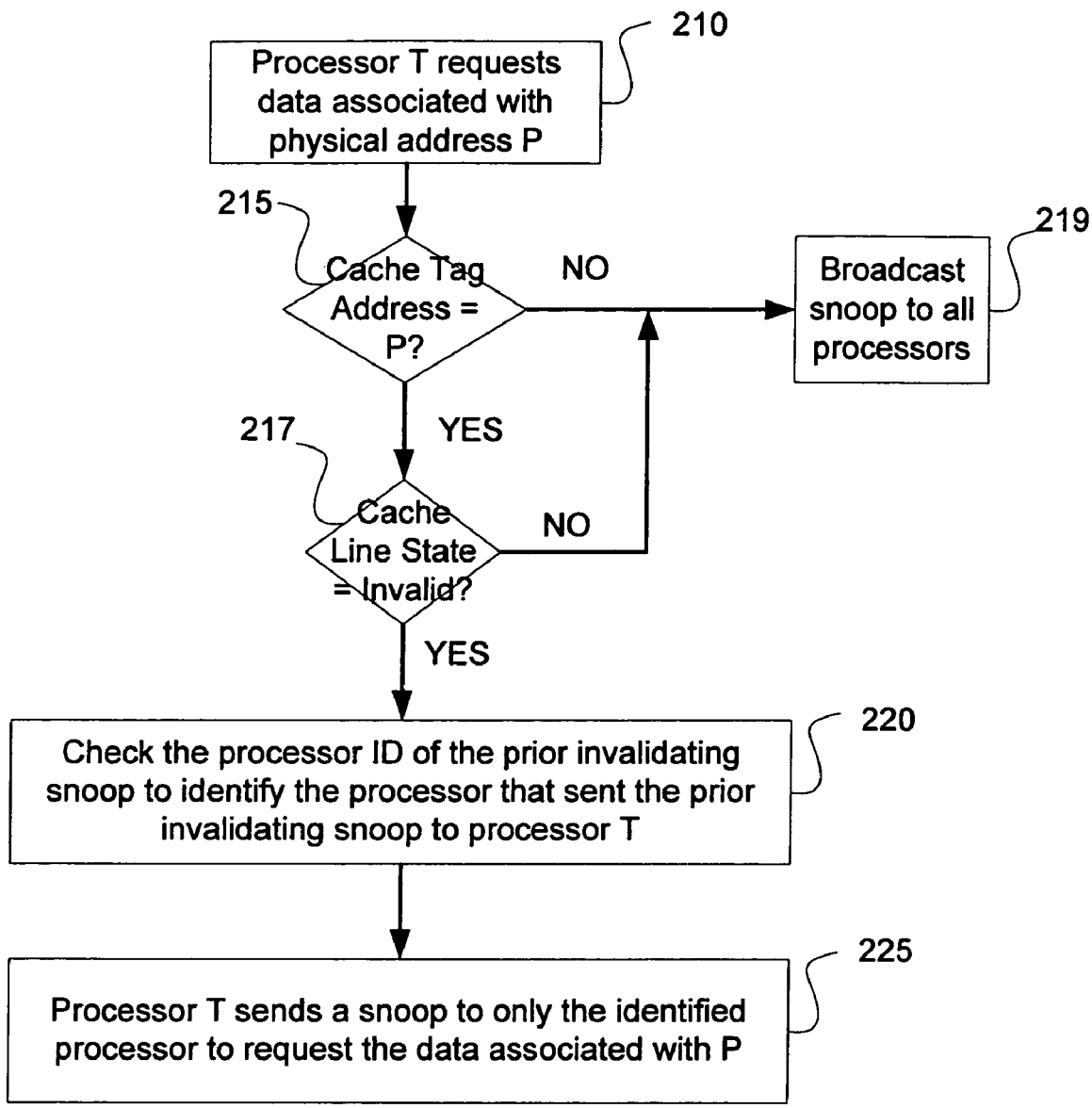
FIG. 2 shows one embodiment of a process to predict which processor within a multiprocessor system is most likely to have the data requested in a cache of the processor.

FIG. 2 shows one embodiment of a process to predict which processor within a multiprocessor system is most likely to have the data requested in a cache associated with the processor. The process is performed by processing logic that may comprise hardware (e.g., circuitry, dedicated logic, etc.), software (such as a program operable to run on a general-purpose computer system or a dedicated machine), or a combination of both. FIG. 1A shows one embodiment of a process to keep track of which processor in a multiprocessor system sends an invalidating snoop to another processor in the multiprocessor system. The process is performed by processing logic that may comprise hardware (e.g., circuitry, dedicated logic, etc.), software (such as a program operable to run on a general-purpose computer system or a dedicated machine), or a combination of both. The processing logic may also comprise firmware (i.e., microcode). In one embodiment, the processing logic is integrated into each of the processors predicting locations of data.

The process begins when one of the processors within the multiprocessor system, processor T, requests data associated with physical address P (processing block 210). For instance, processor T may request the data in an attempt to load the data. In response to processor T's request, processing logic checks whether any of the cache tag address(es) in the cache tag array (e.g., the cache tag array 130 in FIG. 1B) of the cache of processor T matches physical address P (processing block 215). If none of the cache tag addresses in the cache tag array matches the physical address P, then processing logic may broadcast a snoop to the rest of the processors in the multiprocessor system to request a copy of the data associated with physical address P (processing block 219). Alternatively, processing logic may send a snoop to a processor responsible for the segment in the memory containing physical address P (also referred to as the home node of physical address P) to request a copy of the data associated with physical address P.

However, if one of the cache tag addresses in the cache tag array of processor T's cache matches physical address P, then processing logic checks whether the corresponding cache line state in the cache state array (e.g., the cache state array 140 in FIG. 1B) of processor T's cache is Invalid (processing block 217). Although not shown, if one of the cache tags matches the physical address and the cache line state is valid, the data is accessed and the process ends. If the corresponding cache line state in the cache state array of processor T's cache is not Invalid (and not valid), then processing logic may broadcast a snoop to the rest of the processors in the multiprocessor system to request a copy of the data associated with physical address P (processing block 219). Alternatively, processing logic may send a snoop to the home node of physical address P to request a copy of the data associated with physical address P. If the corresponding cache line state in the cache state array of processor T's cache is Invalid and not valid, then processing logic transitions to processing block 220.

Note that if one of the cache tag addresses of processor T is physical address P and the corresponding cache line state is Invalid, processing logic may infer that the cache of processor T has previously stored a copy of the data associated with physical address P, but the copy has been invalidated by another processor, which is now likely to have a valid copy of the data. Thus, processing logic checks the processor ID recorded in the cache of processor T in response to the prior invalidating snoop in order to identify the invalidating processor (processing block 220). As discussed above, the ID of the invalidating processor is encoded in the cache line state corresponding to the cache tag address field containing physical address P in some embodiments. Thus, processing logic may decode the cache line state in order to identify the invalidating processor.

After identifying the invalidating processor, processing logic sends a snoop to only the identified invalidating processor to request a copy of the data associated with physical address P (processing block 225). Compared with one conventional practice, in which a snoop is sent to each of the rest of the processors in the multiprocessor system, the above technique reduces network utilization by sending a snoop to only the identified invalidating processor. For example, in an eight-processor system, processing logic may have to send seven snoops, one to each of the seven processors in the eight-processor system, according to one conventional approach. However, using the above technique, processing logic sends a snoop to only one processor in the eight-processor system, i.e., the identified invalidating processor. Hence, network utilization may be significantly reduced using the above technique.

Figure 3:
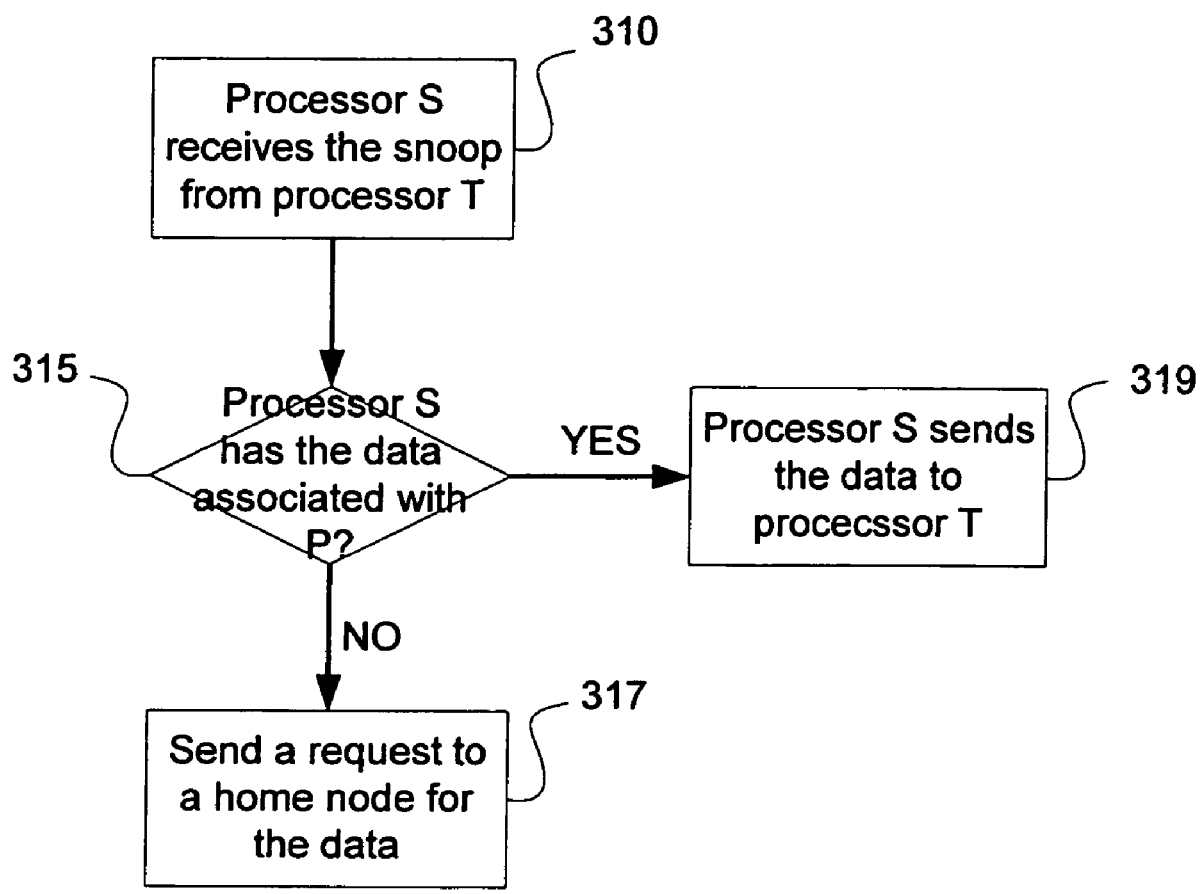
FIG. 3 illustrates one embodiment of a process to provide the data requested to another processor within a multiprocessor system.

FIG. 3 illustrates one embodiment of a process to provide data requested to another processor within a multiprocessor system. The process is performed by processing logic that may comprise hardware (e.g., circuitry, dedicated logic, etc.), software (such as a program operable to run on a general-purpose computer system or a dedicated machine), or a combination of both.

Referring back to the example discussed above with reference to FIG. 2, processing logic may cause processor T to send a snoop to only the identified invalidating processor to request a copy of the data associated with physical address P. Suppose the identified invalidating processor is processor S. The process in FIG. 3 begins when processor S receives the snoop from processor T (processing block 310). Processing logic checks whether the cache of processor S has the data associated with the physical address P and the data has a valid cache line state (processing block 315). If the cache of processor S has the valid data associated with physical address P, the prediction made by processor T is correct and processing logic causes processor S to send a copy of the data to processor T (processing block 319).

However, if the cache of processor S does not have valid data associated with physical address P, processing logic may send a request to a home node to request the data (processing block 317). As mentioned above, the home node of the data associated with physical address P is a processor within the multiprocessor system responsible for the segment of the memory in the system containing physical address P. In some embodiments, the home node may send snoops to other processors in the multiprocessor system (except processors S and T) to check if any one of these processors has a copy of the data in its cache. If none of these processors has a copy of the data in its cache, the home node may retrieve the data from the memory at physical address P. Alternatively, the home node may go ahead to retrieve the data from the memory without first sending snoops to other processors.

Figure 4:
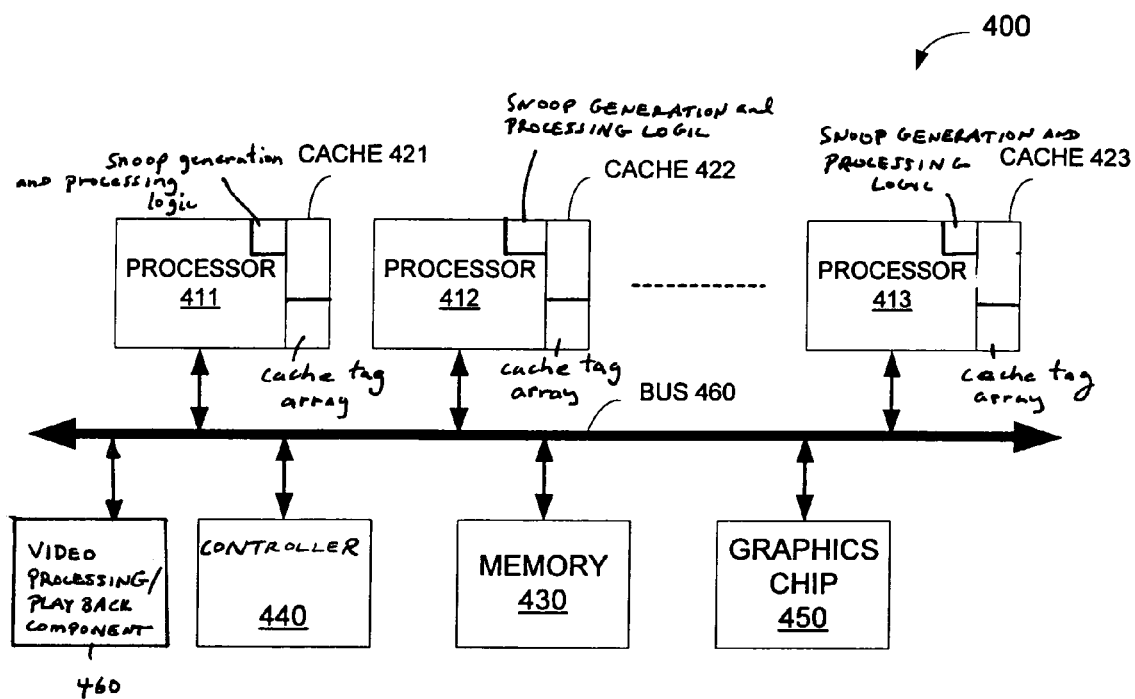
FIG. 4 illustrates an example of an embodiment of a multiprocessor system.

FIG. 4 shows an example of an embodiment of a multiprocessor system 400 usable with some embodiments of the invention. The system 400 includes a number of processors 411-413, a number of caches 421-423, a communication controller (e.g., Peripheral Component Interface (PCI) bridge) 440, a memory 430, a graphics chip 450, a video processing/playback chip 460 and a interconnect (e.g., bus) 460. Each of the caches 421-423 is associated with and coupled to one of the processors 411-413. For example, cache 421 is associated with processor 411, cache 422 is associated with processor 412, and cache 423 is associated with processor 413. Note that a cache and a processor associated with the cache may or may not reside on a common integrated circuit substrate. Furthermore, the processors 411-413 may or may not reside on a common integrated circuit substrate with each other. In some embodiments, where the processors 411-413 reside on different integrated circuit substrates, the processors 411-413 are commonly referred to as sockets. The processors 411-413, the controller 440, the memory 430, and the graphics chip 450 may be coupled to each other via the bus 460.

In one embodiment, the caches 421-423 store copies of data associated with some physical addresses of the memory 430. Each of caches 421-423 include a cache tag array, such as, for example, the cache tag array of FIG. 1B, as well as cache processing logic to perform operations described above with respect to the data in the cache tag array. The processors 411-413 may retrieve the copies of the data from the caches 421-423 to reduce latency in data accesses. The processors 411-413 may invalidate snoop generation and processing logic to send invalidating snoops to other processors within the system 400 when the processors update, modify, or change data. The snoop generation and processing logic may also process received snoops. The snoop generation and processing logic may be part of each processor cache or separate from the cache. By recording the ID of the processors that send the invalidating snoops, other processors may predict which one of the processors within the system 400 is most likely to have a current valid copy of the data requested. Based on such prediction, the processors may send a snoop to only the processor that is most likely to have the current valid copy of the data requested. Details of some embodiments of the process to keep track of which processor sends an invalidating snoop, the process to predict which processor within a multiprocessor system is most likely to have the data requested in a cache of the processor, and the process to provide the data requested to another processor within a multiprocessor system have been discussed above.

Video processing/playback devices 460 may comprise a component to retrieve video data from memory 430 and manipulate the data. The manipulation may be decoding, formatting or other routine processing to prepare the video data for display.

Note that any or all of the components and the associated hardware illustrated in FIG. 4 may be used in various embodiments of the system 400. However, it should be appreciated that other configurations of the system 400 may include more or fewer devices than those shown in FIG. 4. Furthermore, one should appreciate that the technique disclosed is applicable to different types of system environment, such as a multi-drop environment or a point-to-point environment. Likewise, the disclosed technique is applicable to both mobile and desktop computing systems.

Some portions of the preceding detailed description have been presented in terms of symbolic representations of operations on data bits within a computer memory. These descriptions and representations are the tools used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description above. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method comprising:
receiving at a first processor an invalidating snoop with respect to a physical address of a portion of a memory in a multiprocessor system from a second processor;
checking whether a cache of the first processor stores a copy of data associated with the physical address;
invalidating a cache line state of the first processor corresponding to the physical address if the cache of the first processor stores the copy of data associated with the physical address; and
recording an identification (ID) of the second processor if the cache of the first processor stores the copy of data associated with the physical address, wherein the recording includes encoding the ID of the second processor in the cache line state of the first processor corresponding to the physical address.

2. The method of claim 1, further comprising:
in response to an attempt by the first processor to load data from the physical address, checking whether a cache tag address field of the first processor contains the physical address; and
checking whether the cache line state of the first processor corresponding to the physical address is invalid if the cache tag address field of the first processor contains the physical address.

3. The method of claim 2, further comprising:
if the cache line state of the first processor is invalid,
identifying the second processor using the cache line state of the first processor; and
sending a snoop to only the second processor to request the data associated with the physical address.

4. The method of claim 3, further comprising:
in response to the snoop, checking whether a cache of the second processor stores the data associated with the physical address; and
sending the data associated with the physical address to the first processor from the second processor if the cache of the second processor stores the data associated with the physical address.

5. The method of claim 3, wherein identifying the second processor using the cache line state of the first processor comprises:
decoding the cache line of the first processor to extract the ID of the second processor.

6. A machine-accessible medium that provides instructions that, if executed by a first processor, will cause the first processor to perform operations comprising:
receiving an invalidating snoop with respect to a physical address of a portion of a memory in a multiprocessor system from a second processor;
checking whether a cache of the first processor stores a copy of data associated with the physical address; and
invalidating a cache line state of the first processor corresponding to the physical address if the cache of the first processor stores the copy of data associated with the physical address; and
recording an identification (ID) of the second processor if the cache of the first processor stores the copy of data associated with the physical address, wherein the recording includes encoding the ID of the second processor in the cache line state of the first processor corresponding to the physical address.

7. The machine-readable medium of claim 6, wherein the operations farther comprise:
in response to an attempt by the first processor to load data from the physical address, checking whether a cache tag address field of the first processor contains the physical address; and
checking whether the cache line state of the first processor corresponding to the physical address is invalid if the cache tag address field of the first processor contains the physical address.

8. The machine-readable medium of claim 7, wherein the operations further comprise:
if the cache line state of the first processor is invalid,
identifying the second processor using the cache line state of the first processor; and sending a snoop to only the second processor to request the data associated with the physical address.

9. The machine-readable medium of claim 8, wherein the operations further comprise:
in response to the snoop, checking whether a cache of the second processor stores the copy of the data associated with the physical address; and
sending the copy of the data associated with the physical address to the first processor from the second processor if the cache of the second processor stores the copy of the data associated with the physical address.

10. The machine-readable medium of claim 8, wherein identifying the second processor using the cache line state of the first processor comprises:
decoding the cache line state of the first processor to extract the ID of the second processor.

11. A system comprising:
a memory;
a video processing component coupled to the memory;
a first processor coupled to the memory;
a first cache coupled to the first processor; and
a second processor coupled to the memory, the second processor including processing logic to send an invalidating snoop to the first processor with respect to a physical address of a portion of the memory, wherein the first processor includes processing logic to check whether the first cache stores a copy of data associated with the physical address in response to the invalidating snoop, to invalidate a cache line state associated with the physical address if the first cache stores the copy of the data associated with the physical address, and to record an identification (ID) of the second processor if the first cache stores the copy of the data associated with the physical address by encoding the ID of the second processor in the cache line state of the first processor.

12. The system of claim 11, wherein, in response to an attempt by the first processor to load data from the physical address, the first processor checks whether a cache tag address field of the first processor contains the physical address and checks whether the cache line state of the first processor is invalid if the cache tag address field contains the physical address.

13. The system of claim 12, wherein, if the cache line state of the first processor is invalid, the first processor extracts the ID of the second processor from the cache line state of the first processor to identify the second processor and sends a snoop to only the second processor to request the data associated with the physical address.

14. The system of claim 13, further comprising a second cache coupled to the second processor, wherein the second processor checks whether the second cache stores the data associated with the physical address in response to the snoop sent by the first processor and the second processor sends a copy of the data to the first processor if the second cache stores the data associated with the physical address.

15. The system of claim 11, wherein the first processor and the second processor reside on a common integrated circuit substrate.

16. The system of claim 11, wherein the first processor and the second processor reside on different integrated circuit substrates.

17. An apparatus comprising:
snoop processing logic to receive an invalidating snoop with respect to a physical address of a portion of a memory in a multiprocessor system from a processor;
cache processing logic coupled with the snoop processing logic to check whether a cache stores a copy of data associated with the physical address, to invalidate a cache line state associated with the physical address if the first cache stores the copy of the data associated with the physical address, and to record an identification (ID) of the processor if the cache stores the copy of data associated with the physical address by encoding the ID of the processor in the cache line state.

18. The apparatus of claim 17, wherein, in response to an attempt to load data from the physical address, the cache processing logic extracts the ID of the processor from the cache line state to identify the processor and the snoop processing logic sends a snoop to only the processor to request the data associated with the physical address.

* * * * *